United States Patent [19]

Miller

[11] Patent Number: 5,608,784
[45] Date of Patent: Mar. 4, 1997

[54] METHOD OF PERSONNEL VERIFICATION USING VOICE RECOGNITION

[76] Inventor: Joel F. Miller, 65 Oriental Blvd., Manhattan Beach, N.Y. 11235

[21] Appl. No.: 186,450

[22] Filed: Jan. 24, 1994

[51] Int. Cl.⁶ .............................. H04M 1/66; H04M 1/57
[52] U.S. Cl. .............................. 379/88; 379/188; 379/67; 379/127
[58] Field of Search .............................. 379/67, 188, 199, 379/189; 395/2.55, 2.56, 2.57, 2.58, 2.59

[56] References Cited

U.S. PATENT DOCUMENTS

| | | | |
|---|---|---|---|
| 4,740,788 | 4/1988 | Konneker | 340/825.49 |
| 4,827,518 | 5/1989 | Fuestel et al. | 395/2.55 |
| 4,837,804 | 6/1989 | Akita | 379/196 |
| 4,864,622 | 9/1989 | Iida et al. | 381/41 |
| 4,998,279 | 3/1991 | Weiss | 380/23 |
| 5,142,565 | 8/1992 | Ruddle | 379/95 |
| 5,181,238 | 1/1993 | Medamana | 379/95 |
| 5,187,735 | 2/1993 | Garcia | 379/88 |
| 5,216,706 | 6/1993 | Nakajima | 379/100 |
| 5,220,595 | 6/1993 | Uehara | 379/74 |
| 5,255,183 | 10/1993 | Katz | 379/142 |
| 5,274,695 | 12/1993 | Green | 379/91 |
| 5,297,194 | 3/1994 | Hunt et al. | 379/199 |
| 5,365,574 | 11/1994 | Hunt et al. | 379/199 |

OTHER PUBLICATIONS

Birnbaum et al, "A Voice Password System for Access Security" AT&T Technical Journal, Sep./Oct. 1986 pp. 68–74.

Primary Examiner—Ahmad F. Matar
Assistant Examiner—Daniel S. Hunter
Attorney, Agent, or Firm—Furgang & Milde, LLP

[57] ABSTRACT

There is provided computerized method of enrollment in a computerized system and the verification of the location of employees. Each employee, using a predetermined set of instructions, telephones a computer which, under the control of a program and a voice recognition and speech identification device, derives a voice print of the employee. When the employee is sent to a location, the ANI and voice print, which are in the computer's database, are verified. If the correct telephone is used, and the voice print compares, the time and place of the telephone call and the employee are recorded for later use by the employer.

14 Claims, 2 Drawing Sheets

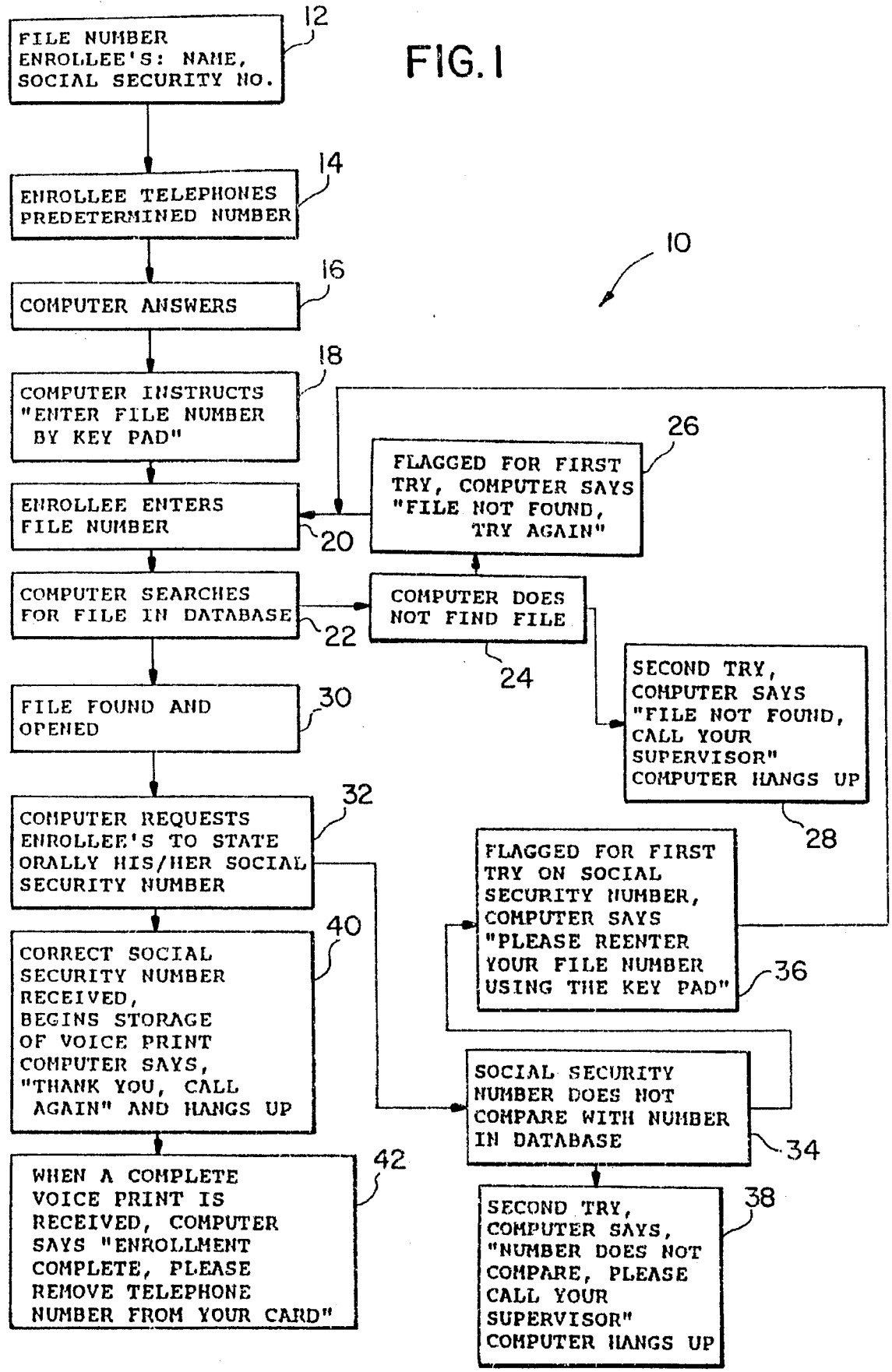

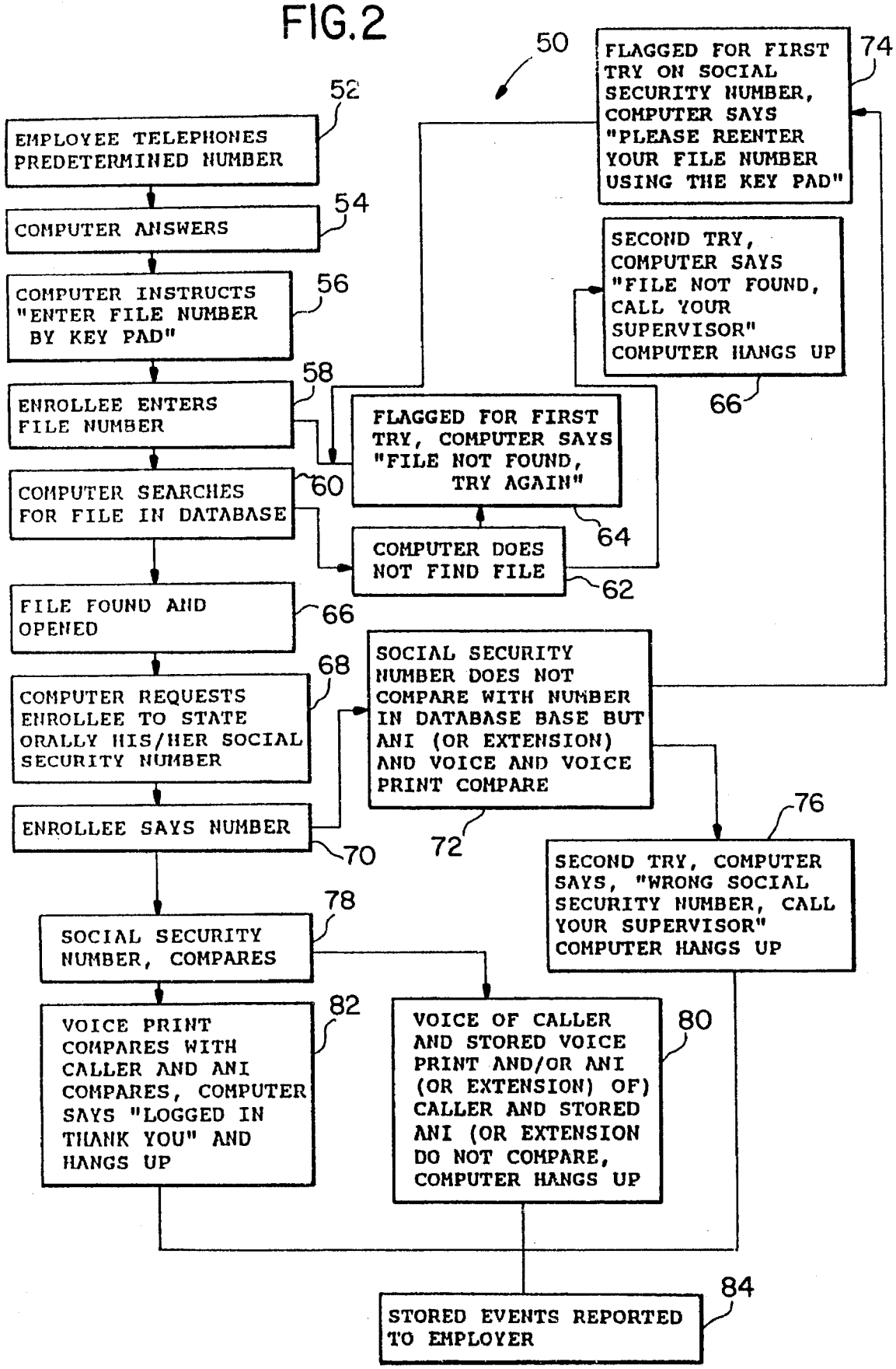

METHOD OF PERSONNEL VERIFICATION USING VOICE RECOGNITION

BACKGROUND OF THE INVENTION—FIELD OF APPLICATION

This invention relates to methods for the verification of the time and location of individuals, such as employees.

BACKGROUND OF THE INVENTION—DESCRIPTION OF THE PRIOR ART

It is well known to require individuals, such as employees, to "check in" with their employers. This is particularly so where the employee is sent away from the premises of the employer or where the employee is working at some distance from a supervisor. Examples of such situations include a visiting nurse who cares for ill or incapacitated individuals in their residences or in large facilities, such as hospitals, where employees may come and go out of the visual observation of their supervisors.

In such circumstances, it is not uncommon for employees to be placed on their "honor". Employees are requested to call in. By this, the employee reaching his/her destination telephones the employer/supervisor and state that he/she has arrived and to telephone again when he/she is leaving. In many instances, employee compensation is based upon the presence of the employee at the desired location and during the desired time period.

The employer/supervisor has no immediate way of checking on whether the employee actually was at the designated location. Policing of whether or not an employee complies with the employment requirement is usually quite expensive, time consuming, and inefficient to perform.

Thus employees have been known to violate the honor system by reporting in from other locations or having substitutes report in for them so as to obtain income without working, even to have someone imitate the employee's voice. Imitation is not always necessary. The employer/supervisor may not be familiar with the employee's voice to defeat a check-in system one need only represent to the employer/supervisor that the person calling is the employee. Where numerous employees are involved, imitation of an employee's voice is not necessary since it is doubtful that the employer would know or be able to distinguish the employee's voice from other employees. Providing personal identification numbers (PINs) are of little assistance in this regard because the employee can pass these to others who assist him/her.

SUMMARY OF THE INVENTION

It is an object of this invention to provide a substantially fool-proof system of individual verification of location and time.

It is yet another object of this invention to use computerized means of verifying the employee's location and time so as to defeat those that would otherwise violate the honor system.

It is still another object of this invention to use voice and speech recognition means to verify the identity of an employee telephoning his/her presence.

It is a further object of this invention to use the ANI of a telephone system to verify the location of the employee.

It is yet another object of this invention to use the extension number of the telephone from which the employee calls to verify the location of the employee.

It is yet a further object of this invention to use computerized phone operating systems to receive the location and identity of the caller and store same in a database for later provision to a third party.

In accordance with this invention there is provided a method of verification of the time and location of an enrolled individual, the method being of the type which uses a computer, having a computer program being capable of communicating with a telephone system and accessing a database, the telephone system being of the type which provides automatic number identification (ANI), or PBX extension, the database having stored therein at least one file having data corresponding to a particular individual including at least that individual's voice print and the telephone identification data from which the individual is expected to communicate by the telephone system with the computer, and wherein the computer system further includes a speech recognition and voice identification device for comparing the voice of the individual communicated through the telephone system with the individual's stored voice print, the method comprising the steps of:

a) receiving from the individual at least one oral response to a request provided by the program through the telephone system;

b) comparing, by the program, the data in the individual's response with data stored in the file in the database;

c) processing, by the program, the data provided by the individual voice characteristics of the received oral response, the data identifying file, and the telephone identification data; and, if the compared data meet predetermined criteria, then d) storing in the database, by the program, at least the chronological information of the telephone communication and that the identity of the individual communicating with the computer through the telephone system is the same individual identified in the file and is communicating through a telephone system providing the predetermined telephone identification data.

In accordance with another embodiment of this invention there is provided a method of enrolling an individual in a computer based telephone answering system wherein the computer uses a voice verification and speech identification device, a computer program, at least one database in which files may be created for storing data including a voice print created by the voice verification and speech identification device, personal identification data, and means to communicate with an individual telephoning the computer, and wherein the telephone system provides automatic number identification (ANI), or PBX extension, the method steps of enrolling the individual comprising:

a) answering the telephone by the program;

b) requiring the enrollee to orally respond to at least one request provided by the program;

c) deriving from the response the enrollee's voice print by means of the voice recognition and speech identification means; and f) storing, by the program, the enrollee's voice print in the database.

BRIEF DESCRIPTION OF THE DRAWING

FIG. 1 is a flow diagram of the enrollment of an individual in accordance with the teachings of the method of this invention; and FIG. 2 is a flow diagram of the employee verification in accordance with the teachings of the method of this inventions.

DESCRIPTION OF THE PREFERRED EMBODIMENTS

In order to verify the location of employees, there may be provided a computerized telephone answering system. One such system is that provided by Intervoice, Inc. under their trademark ROBOTOPERATOR. The ROBOTOPERATOR is an integrated unit comprising a computer operated by a computer program. The computer program operates with a database of any well-known configuration for storing data. The ROBOTOPERATOR also uses a voice and speech verification card. Such devices or cards are inserted into a slot in a computer, such as, for example an IBM PS/2 or equivalent or in the attached ROBOTOPERATOR. Voice recognition devices are well known. These devices decipher the exact speech pattern of the caller so that, for example, the caller can place an order by telephone. Voice and speech recognition devices are also well know and not only recognize speech but also establish a voice print (much like a finger print) of the caller. In this way, such devices are used not only to understand the caller, but to also identify the caller. This voice print is then storable in the database. This invention uses the capabilities of the voice recognition and speech verification card as well as characteristics of the telephone system to which the computer is attached.

The first step is to enroll the employee or participant in the use of the system. The flow diagram setting forth the method steps 10 are shown in FIG. 1. To this end, there is supplied to the system's database information 12 which is used to identify the employee for enrollment and then, after enrollment, for verification. This information may include the file number, the employee's name, and the employee's social security, and the automatic number indication or ANI, if the calls are made from external phone, or the extension number of the employee is to call from within an institution having a PBX. The enrollee is provided with a visually readable medium, such as a wallet-sized card. On the card (not shown) may be imprinted such information that the enrollee is required to provide to the computer and the telephone number of the computer. This may include the file number and the employee's social security number.

To enroll, the enrollee telephones the computer on a restricted line. For example the computer may be connected to one or more dedicated 800 telephone lines 14. Alternatively, the card provided to the enrollee may have a code which the enrollee is required to enter either orally or by the touch pad on the telephone to access the system's enrollment program. In either event, the specific portion of the computer program is then triggered for enrollment.

The computer (not shown) answers 16. The computer program assumes theft the caller is seeking to enroll and access the enrollment program. The program then asks the enrollee to enter the file number (found on the card) by using the touch pad of the telephone 18. This method steps is based on the current state of the art. In the future, it may be possible for the enrollee to orally state the file number. The limitation upon entering the file number orally at present is that this first step slows down the accession rate to the system. This invention contemplates either method of entering the file number or code.

In response to the computer's prompt, the enrollee enters the file number 20 through the key pad. The computer then searches 22 for the file created earlier 12.

If the computer does not find the file 24, the program flags the attempt as a first try 24 and asks the enrollee to try again 26. The enrollee then enters the file code preferably from the key pad 18. The computer searches for the file in the database 22. If not found 24, the flag tells the program to preferably state 28 to the enrollee "File not found, call your supervisor." The computer might say anything that is desired. However, after that, the computer terminates the telephone call.

If an existing file is found, it is opened 30. The computer then requests the enrollee to respond orally to a particular code. This code is preferably a numeric code and, in particular, the employee's social security number 32.

If the social security number does not compare with the social security number in the file, the enrollee's response is flagged as a first try 36 and the enrollee is asked to "Please reenter your file number using the key pad." The enrollee then enters his file number 20, the computer searches and retrieves the file 22, 30, and the computer requests the social security number 32. If the flagged entry is still incorrect 38, the computer states "Number does not compare. Please call your supervisor." The compute then hangs up.

If, on the second try, an incorrect file number is given, the computer recognizes the flag 24 and terminates the call by requesting that the enrollee call his/her supervisor 28.

If either on the first or second try a correct social security number has been given, the computer stores the voice print 40 of the enrollee. In the Intervoice system, in order to create a voice print specific to the enrollee, the enrollee must make several telephone calls. Intervoice also prefers that such calls be made from a number of different telephones so that background noise can be accounted for in making the voice print. In the future, these requirements may be eliminated. In the context of the present and preferred method, the computer will tell the enrollee to the effect "Thank you, call again." The enrollee will then be instructed to call back at a predetermined time and to keep calling back until the voice print is completed by the Intervoice program 42 and the computer will say "Enrollment complete, please remove the telephone number from your card." In this connection, the wallet-sized card might have the number or code imprinted on a removable paper strip. Once enrolled, the employee removes the strip to expose either, for example, another code or a separate 800 telephone number. The employee may be asked to provide an employer or department number.

As an enrolled employee, the employee is then instructed to go to the predetermined location to engage in his/her occupation or activity. Once at the location, (referring to the flow diagram 50, FIG. 2) the employee uses, for example, the 800 number (or, where an employee at a extension of a single location) an extension number and calls the computer 52. The computer answer 54. The computer program then requests 56 the employee to enter his file number using the telephone key pad 56. As before, the art may progress to where a speedy inquiry may one day be made by using voice recognition.

The employee enters his file number 58. The computer searches its database for the file 60. If the computer does not find the file 62, it flags the call as a "first try" 62 and prompts the employee by saying "File not found. Try again." 64. The employee is then required to the part of the program where he/she enters the file number 58.

The computer searches for the file 60, if not found 62, the program recognizes the flag and tells the caller "File not found, call your supervisor" 66 and hangs up. As a consequence of a file not having been opened, there is no record of the telephone call.

If on either the first or second try, the employee identifies a file, the computer opens that file 66. The computer then asks the employee to state his social security number 68. As in enrollment, the employee states the social security number one digit at a time 70, with each digit spaced by the computer by an audible tone.

As the employee is reciting his social security number, the computer checks the employee's ANI, or, in the case of a PBX system, extension. In addition, the computer, using the voice recognition and verification device, compares the employee's oral recitation of numbers with the stored voice print created during enrollment.

As a first stage, if the computer does not find the social security number in the file 70, but finds that the voice print and the ANI (or extension) compare 72, it will flag the call and instruct the employee to reenter the file number 74, preferably using the key pad, thereby returning the employee to that point in the method 58. As a flagged response, if the employee, on this occasion, now enters a nonexistent file, the computer will, after a search 60, not find the file 62, and terminate the call without making a record of the call.

If the file is found 66, the computer again asks for the social security number 68. If the social security number still does not compare with the stored social security number 72 but the voice of the caller with the stored voice print and the incoming ANI (or PBX extension) with the stored ANI (or PBX extension) compare 76, the computer terminates the telephone. The computer tells the caller, "Wrong social security number, call your supervisor" and hangs up. A record is made of the call including the incorrect social security number that did not compare, the date and time of the call and that the ANI (or PBX extension) and/or voice print did compare. If the ANI (or PBX extension) does not compare, a record is also made of the incoming ANI (or PBX extension). This record is made in the employee's file. In the alternative, the program may accept the incorrect social security number.

If, on either the first or second try, the social security number does compare 78 but the voice of the caller does not compare with the stored voice print and/or the incoming ANI (or PBX extension) does not compare with the stored ANI (or PBX extension) 80, the computer program makes a record in the file of the employee in the database of a comparison of the social security number and that the incoming ANI (or PBX extension) and/or that the voice of the caller and the stored voice print did not compare and the date and time of the incoming call. Where the incoming ANI (or PBX extension) does not compare, a record is made of the incoming ANI (or PBX extension) in the file of the employee. The computer does not alert the caller that this incorrect information has been received since such information is evidence of improper conduct on the part of the employee (e.g., someone masquerading as the employee (where the voice of the caller does not compare with the voice print) or that the employee has gone to the wrong location, (where the incoming ANI (or PBX extension) does not compare with the stored ANI (or PBX extension). The computer program generates a "call terminated" or may say nothing and hangs up.

Where the social security number provided by the callers compares with the social security number stored in the database file of the employee and the incoming ANI (or PBX extension) compares with the ANI (or PBX extension) in the employee's database file and the voice of the caller compares with the stored voice print 82, the computer records the call, along with the fact of the correct comparison and the date and time of the call.

The collected information in employee files are then collected in a report in a well-known manner. All data, whether or not in a report, may then be transmitted to a third party, such as the employer by a hard copy or by any well known means such as on tape or by modem down loading transmission. It is also in the contemplation of this invention to provide the third party with restricted access to the records. Such restriction may be by the usual code-access which opens only that third party's employee files. At that point, the files may be copied or transmitted to the employer or other third party.

As noted above, this invention of enrollment and verification can be adapted for those that work in a large facility, such as a hospital. In such circumstances, employees frequently work at numerous fixed locations in the hospital and supervisors find it difficult, if not impossible, to determine that each employee is at his/her proper location at the required times, particularly where there are multiple and overlapping shifts.

Generally, in such facilities, the telephones are linked together in a PBX. Rather then supplying the ANI, the PBX has the extension. In this situation, the method includes the maintenance of a local PBX (not shown). If employees are calling the computer, and more calls are received than there are ports, the call is transferred to the local PBX which holds the call and, as a characteristic of the local PBX, retains the extension number. Thus, when a port clears, the local PBX transfers the call back to the computer without the loss of the call and its extension number.

In use, the employee must be at the employee's station at the call-in times and cannot be elsewhere or have someone else report in that employee. It should be noted that the expressions stated by the program are not part of this invention and may be changed to suit the particular purpose of the user.

It is understood that although there has been shown and described preferred embodiment of the invention that various modifications may De made in the details thereof without departing from the spirit as comprehended by the following claims.

What is claimed is:

1. A method of enrolling an individual in a computer based telephone system, wherein the computer uses a voice verification and speech identification device; a computer program; at least one database in which files may be created for storing data including a voice print created by the voice verification and speech identification device; predetermined identification data; and means to communicate with an individual telephoning the computer, and wherein the telephone system provides automatic number identification (ANI) or PBX extension, the steps of enrolling the individual comprising:

provider the enrollee with at least first predetermined data;

answering a telephone communication by the program;

requiring the enrollee to orally respond to at least one request generated by the computer program for the first predetermined data, by answering at least one inquiry;

receiving a response from the enrollee, including the first predetermined data;

deriving from the response the enrollee's voice print by means of the voice recognition and speech identification means;

storing, by the program, the enrollee's voice print in the database;

comparing the received first predetermined data with second predetermined data stored in the database to determine whether predetermined criteria are met;

if said predetermined criteria are met, opening at least one file for the storing of data;

requesting the enrollee to initiate a subsequent telephone communication, and upon receiving the subsequent telephone communication, requesting the enrollee to provide an oral response including data.

2. The method according to claim 1, further comprising the steps of:

a) receiving a subsequent telephone communication from the individual through the communication means;

b) requiring the enrollee to orally respond to a prompt with identifying information during the subsequent telephone communication;

c) deriving, from the response to the prompt, voice characteristics of the enrollee by the voice recognition and speech identification device; and d) comparing the derived voice characteristics to previously stored voice characteristics, identifying the enrollee based on the voice characteristics and identifying information.

3. The method according to claim 2, wherein the communication means further comprises means for automatically identifying an originating telephone, further comprising the steps of storing an identification of an originating telephone from which the enrollee is expected to later communicate in association with the file of the database in which the voice characteristics and identifying information are stored; and comparing an identification of the originating telephone with the stored identification of an expected originating telephone.

4. A method of enrolling an individual in a computer program-controlled telephone answering system having a computer voice verification and speech identification device; a database having files to which information may be added for storing data including identifying voice characteristics created by the voice verification and speech identification device, individual identification data; and means to communicate with an individual telephoning the computer, said method comprising the steps of:

a) receiving a first telephone communication from the individual through the communication means;

b) requiring the enrollee to orally respond to a first prompt with identifying information during the first telephone communication;

c) deriving, from the response to the first prompt, voice characteristics of the enrollee by the voice recognition and speech identification device;

d) storing the derived voice characteristics in a file of the database, the file further including identifying information of the enrollee;

e) receiving a second telephone communication from the individual through the communication means;

f) requiring the enrollee to orally respond to a second prompt during the second communication;

g) deriving, from the response to the second prompt, voice characteristics of the enrollee by the voice recognition and speech identification device; and h) storing the latter derived voice characteristics in association with the file of the database in which previously the voice characteristics and identifying information are stored.

5. The method according to claim 4, wherein the communication means further comprises means for automatically identifying an originating telephone, further comprising the step of storing an identification of an originating telephone from which the enrollee is expected to later communicate in association with the file of the database in which the voice characteristics and identifying information are stored.

6. The method according to claim 4, wherein the first prompt requests predetermined identifying information, the response being compared to stored information based on predetermined criteria.

7. The method according to claim 6, wherein the second prompt requests predetermined identifying information, the response being compared to stored information based on predetermined criteria.

8. A method for verifying a location of an individual and a time of communication, the individual having been previously registered to determine an identifying voice characteristic and association with a file identification, comprising:

providing a database having records including individual identification information, voice characteristic information and communication channel identification information, each record being capable of storing communication channel identification information for at least two communication channels;

receiving a communication from the individual;

receiving, in conjunction with the communication from the individual, an automatic identification of a communication channel used for communication by the individual;

receiving a spoken message from the individual including an identifying voice characteristic and file identification;

retrieving a record from the database;

comparing the identifying voice characteristic in the received spoken message to the voice characteristic information in the database record to determine a correspondence;

comparing the individual identification information in the received response to corresponding individual identification information in the database record to determine a correspondence;

comparing the received communication channel identification information to corresponding communication channel identification information in the database record to determine a correspondence; and storing, on the basis of the correspondences of the identifying voice characteristics, individual identification information, and communication channel identification information, information relating to the received communication.

9. The method according to claim 8, wherein said comparing the received communication channel identification information step further comprises storing the received identification information of the communication channel in relation to the file identification database record if the received communication channel identification information does not correspond to any stored communication channel identification information, along with a non-correspondence indication.

10. The method according to claim 8, further comprising the steps of determining a chronological period and storing information relating to the chronological period with the information relating to the received communication.

11. The method according to claim 8, further comprising the steps of determining a chronological period, wherein the stored information relating to the received communication comprises an indication of the determined chronological period and identified communication channel, in conjunction with an identifier of the individual, to memorialize individual presence.

12. The method according to claim 8, further comprising the step of storing, the voice characteristic in the received response does not correspond to the voice characteristic information in the database record, the identification data does not correspond to the identification information in the database record, or the received communication channel identification information does not correspond to expected communication channel information, an indication of non-correspondence, whereby the individual is not verified to have been present and communicating through a particular communication channel.

13. The method according to claim 8, wherein the communication channel identification information comprises an ANI.

14. The method according to claim 8, wherein the communication channel identification information comprises a PBX extension.

* * * * *